(12) United States Patent
Satou et al.

(10) Patent No.: US 9,960,425 B2
(45) Date of Patent: May 1, 2018

(54) POSITIVE ELECTRODE MATERIAL, POSITIVE ELECTRODE FOR NON-AQUEOUS ELECTROLYTE SECONDARY BATTERY, AND NON-AQUEOUS ELECTROLYTE SECONDARY BATTERY

(71) Applicant: DENSO CORPORATION, Kariya, Aichi-pref. (JP)

(72) Inventors: Yoshinori Satou, Kariya (JP); Shigeki Komine, Kariya (JP); Nobuo Yamamoto, Kariya (JP); Yuta Shimonishi, Kariya (JP); Yuki Tachibana, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 61 days.

(21) Appl. No.: 15/066,077

(22) Filed: Mar. 10, 2016

(65) Prior Publication Data

US 2016/0293939 A1 Oct. 6, 2016

(30) Foreign Application Priority Data

Mar. 31, 2015 (JP) .................................. 2015-71778

(51) Int. Cl.
*H01M 4/36* (2006.01)
*H01M 4/505* (2010.01)
*H01M 4/525* (2010.01)
*H01M 4/485* (2010.01)
*H01M 10/0525* (2010.01)

(52) U.S. Cl.
CPC ........... *H01M 4/525* (2013.01); *H01M 4/485* (2013.01); *H01M 4/505* (2013.01); *H01M 4/364* (2013.01); *H01M 10/0525* (2013.01)

(58) Field of Classification Search
None
See application file for complete search history.

(56) References Cited

U.S. PATENT DOCUMENTS

| 2014/0087254 | A1* | 3/2014 | Li | H01M 4/366 429/219 |
| 2014/0087256 | A1* | 3/2014 | Li | H01M 4/366 429/220 |
| 2017/0179470 | A1* | 6/2017 | Choi | H01M 4/364 |

FOREIGN PATENT DOCUMENTS

| CN | 102623694 | * | 8/2012 |
| CN | 102760884 A | * | 10/2012 |
| JP | 2001-057213 A | | 2/2001 |
| JP | 2003-257434 A | | 9/2003 |
| JP | 2003303591 A | * | 10/2003 |

OTHER PUBLICATIONS

Kurilenko et al. Interaction of Li1+x(Ni,Mn,Co)O2 cathode materials with single and complex oxides at 900 ° C. Ionics May 2016, vol. 22, Issue 5, pp. 601-607.*

Vellaisamy et al. Li2Ni0.5Mn0.5SnO4/C: A Novel Hybrid Composite Electrode for High Rate Applications. Inorg. Chem., 2015, 54 (17), pp. 8590-8597.*

* cited by examiner

*Primary Examiner* — Tanisha Diggs
(74) *Attorney, Agent, or Firm* — Harness, Dickey & Pierce, P.L.C.

(57) ABSTRACT

A positive electrode material includes: a composite oxide of solid solution including $Li_2SnO_3$ and $Li_2Ni_\alpha M^1_\beta M^2_\gamma Mn_\nu O_{4-\epsilon}$. $\alpha$ satisfies an equation of $0.50 \leq \alpha \leq 1.35$. $\beta$ satisfies an equation of $0 \leq \beta < 1.0$. $\gamma$ satisfies an equation of $0 \leq \gamma \leq 0.66$. $\beta$ and $\gamma$ satisfies an equation of $0.33 \leq \beta+\gamma \leq 1.1$. $\nu$ satisfies an equation of $0 \leq \nu \leq 0.66$. $\epsilon$ satisfies an equation of $0 \leq \epsilon \leq 1.00$. $M^1$ represents at least one selected from Sn, $Sb_{0.5}Al_{0.5}$. $M^2$ represents Sb.

3 Claims, 5 Drawing Sheets

POSITIVE ELECTRODE MATERIAL, POSITIVE ELECTRODE FOR NON-AQUEOUS ELECTROLYTE SECONDARY BATTERY, AND NON-AQUEOUS ELECTROLYTE SECONDARY BATTERY

CROSS REFERENCE TO RELATED APPLICATION

This application is based on Japanese Patent Application No. 2015-71778 filed on Mar. 31, 2015, the disclosure of which is incorporated herein by reference.

TECHNICAL FIELD

The present disclosure relates to a positive electrode material, a positive electrode for a non-aqueous electrolyte secondary battery, and a non-aqueous electrolyte secondary battery formed by using the positive electrode.

BACKGROUND

With the spread of electronic devices such as notebook computers, mobile phones, and digital cameras, the demand for secondary batteries for driving these electronic devices is on the increase. In recent years, these electronic devices have increasingly high power consumption with enhancement of functionalities thereof and have been expected to be reduced in size, and hence improvement in performance of the secondary batteries has been required. Among the secondary batteries, a non-aqueous electrolyte secondary battery (particularly, a lithium-ion secondary battery) can be increased in capacity, and this battery has thus been applied to a variety of electronic devices.

Generally, a non-aqueous electrolyte secondary battery has a configuration in which a positive electrode and a negative electrode are connected via a non-aqueous electrolyte (non-aqueous electrolytic solution), and stored in a battery case. In the positive electrode, a positive electrode active material layer containing a positive electrode material typified by a positive electrode active material is formed on the surface of a positive electrode current collector. In the negative electrode, a negative electrode active material layer containing a negative electrode active material is formed on the surface of a negative electrode current collector.

In a lithium-ion secondary battery as a typical example of the non-aqueous electrolyte secondary battery, a lithium composite oxide is used as a positive electrode material (positive electrode active material). This composite oxide is described in Patent Literature 1, for example.

Patent Literature 1 describes a non-aqueous electrolyte battery having a positive electrode active material with a Sn-containing oxide deposited on the surface of a lithium nickelate-based oxide ($LiNiO_2$-based oxide).

In the non-aqueous electrolyte secondary battery, there has been a possibility that a crystal structure of a lithium composite oxide used for the positive electrode active material is destructed due to a kind of over-heating, overcharge or the like, to release contained oxygen which would trigger abnormal exothermic reaction, ignition and fuming.

The positive electrode active material described in Patent Literature 1 was aimed at preventing the surface state from deterioration in load characteristics by coating the surface of the lithium nickelate-based oxide with the Sn-containing oxide. However, a structure of the lithium nickelate-based oxide (lithium composite oxide) in the bulk remains as it is.

That is, the above-mentioned problem of deterioration in safety associated with release of oxygen from the lithium nickelate-based oxide with destruction of the crystal structure remains unsolved in the process of charge-discharge cycling as well.

Patent Literature 1: JP 2003-257434-A

SUMMARY

It is an object of the present disclosure to provide a positive electrode material, a positive electrode for a non-aqueous electrolyte secondary battery, and a non-aqueous electrolyte secondary battery, which reduce destruction of a crystal structure of a lithium composite oxide used for a positive electrode active material due to over-heating, overcharge or the like, and which are thus excellent in safety.

According to a first aspect of the present disclosure, a positive electrode material includes: a composite oxide of solid solution including $Li_2SnO_3$ and $Li_2Ni_\alpha M^1_\beta M^2_\gamma Mn_\nu O_{4-\epsilon}$. $\alpha$ satisfies an equation of $0.50 \leq \alpha \leq 1.35$. $\beta$ satisfies an equation of $0 \leq \beta < 1.0$. $\gamma$ satisfies an equation of $0 \leq \gamma \leq 0.66$. $\beta$ and $\gamma$ satisfies an equation of $0.33 \leq \beta+\gamma \leq 1.1$. $\nu$ satisfies an equation of $0 \leq \nu \leq 0.66$. $\epsilon$ satisfies an equation of $0 \leq \epsilon \leq 1.00$. $M^1$ represents at least one selected from Sn, $Sb_{0.5}Al_{0.5}$. $M^2$ represents Sb.

The above positive electrode material is a solid-solution oxide composed by $Li_2SnO_3$ and $Li_2Ni_\alpha M^1_\beta M^2_\gamma Mn_\nu O_{4-\epsilon}$ domains. The positive electrode material of layered structure, including a Li layer and a Ni layer, has a difficulty called "cation mixing," meaning a type of exchange between Li and Ni: those ions exchange the sites from the original sites. By taking this layered structure, the positive electrode material has excellent conductivity of Li ions. It is to be noted that the Li layer is a layer formed with Li as a main component, and is a layer substantially composed of Li. The Ni layer is a layer formed with Ni (Ni compound) as a main component, and is substantially a layer containing Ni, the $M^1$ element, the $M^2$ element, and Mn as main components. In addition, the main component means a component having the largest content ratio.

$Li_2Ni_\alpha M^1_\beta M^2_\gamma Mn_\nu O_{4-\epsilon}$ contains Ni in its composition. This Ni forms a local structure with 6-coordinated oxygen (O) (6-coordinated local structure). As a result, stable charge/discharge is performed. Further, a large amount of Ni as a redox species is contained in the range of $0.50 < \alpha \leq 1.33$, thus leading to achievement of high capacity.

Moreover, large amounts of the $M^1$ element and the $M^2$ element are included, thereby to further stabilize the crystal structure and reduce destruction of the bonding structure during charge/discharge, and as a result, a decrease in battery capacity is reduced. The $M^1$ element and the $M^2$ element strongly fix oxygen. This results in reduction in desorption of oxygen which is concerned at the time of abnormal heat generation, thus leading to further improvement in safety of the battery. Furthermore, when the amounts of the $M^1$ element and the $M^2$ element, or a total amount of the $M^1$ element and the $M^2$ element, is 0.33 or larger, on average, all of the oxygen in the Ni layer is adjacent to and strongly bonded to the $M^1$ element and the $M^2$ element, or either the $M^1$ element or the $M^2$ element, thus significantly enhancing the oxygen desorption reducing effect.

As a result of earnest investigation, the present inventors discovered that $Li_2SnO_3$ has an effect of stabilizing the layered structure including the Li layer and the Ni layer, based on a difference in charge between Li ions and Sn ions. This effect is significantly exhibited also when $Li_2SnO_3$ forms a solid solution with $Li_2Ni_\alpha M^1_\beta M^2_\gamma Mn_v O_{4\in}$, and the solid solution takes a layered structure with excessively little so-called cation mixing.

According to a second aspect of the present disclosure, a positive electrode for a non-aqueous electrolyte secondary battery includes: the positive electrode material according to the first aspect of the present disclosure.

The above positive electrode for a non-aqueous electrolyte secondary battery is formed by using the positive electrode material of the first aspect of the present disclosure, and exerts an effect obtained by the positive electrode material.

According to a third aspect of the present disclosure, a non-aqueous electrolyte secondary battery includes: a positive electrode for a non-aqueous electrolyte secondary battery which includes the positive electrode material according to the first aspect of the present disclosure.

The above non-aqueous electrolyte secondary battery is formed by using the positive electrode material of the first aspect of the present disclosure, and exerts an effect obtained by the positive electrode material.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Hereinafter, the present disclosure will be described in detail with reference to embodiments.

Embodiment

Figure 1:
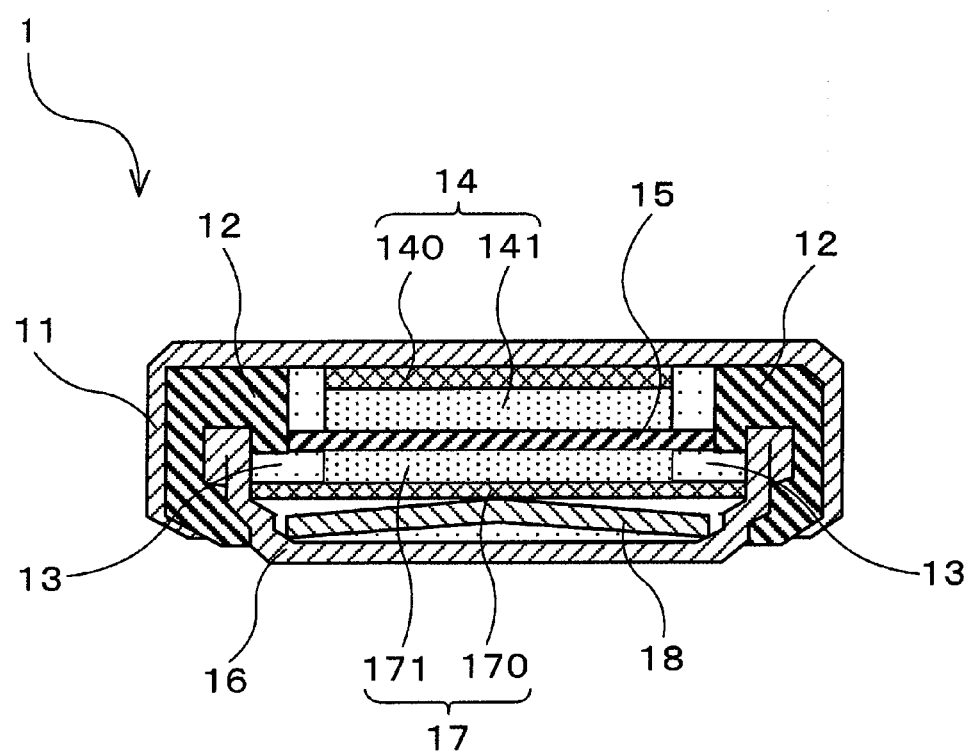
FIG. 1 is a schematic sectional view showing a configuration of a coin type lithium-ion secondary battery of an embodiment.

In the present embodiment, a coin type lithium-ion secondary battery 1, a configuration of which is shown by a schematic sectional view in FIG. 1 is used. The lithium-ion secondary battery 1 of the present embodiment is a secondary battery (non-aqueous electrolyte secondary battery) formed by using a positive electrode (positive electrode for a non-aqueous electrolyte secondary battery) including the positive electrode material of the present disclosure as a positive electrode active material.

The lithium-ion secondary battery 1 of the present embodiment includes a positive electrode case 11, a sealing member 12 (gasket), a non-aqueous electrolyte 13, a positive electrode 14, a positive electrode current collector 140, a positive electrode mixture layer 141, a separator 15, a negative electrode case 16, a negative electrode 17, a negative electrode current collector 170, a negative electrode mixture layer 171, a holding member 18, and the like.

The positive electrode 14 of the lithium-ion secondary battery 1 of the present embodiment includes the positive electrode mixture layer 141 containing the positive electrode active material formed of the positive electrode material of the present embodiment. The positive electrode mixture layer 141 includes, as necessary, a member such as a binder or a conductive material, other than the positive electrode active material.

(Positive Electrode Material)

The positive electrode material is a solid-solution oxide composed of $Li_2SnO_3$ and $Li_2Ni_\alpha M^1_\beta M^2_\gamma Mn_v O_{4-\in}$ obtained by arbitrary way, usually chemical method. This positive electrode material has a difficulty called "cation mixing" as described above. By taking this layered structure, the positive electrode material has excellent conductivity of Li ions. It is to be noted that the Li layer is a layer formed with Li as a main component, and is a layer substantially composed of Li. The Ni layer is a layer formed with Ni (Ni compound) as a main component, and is substantially a layer containing Ni, the $M^1$ element, the $M^2$ element, and Mn as main components.

A method for confirming the layered structure of the composite oxide of the positive electrode material is not limited, but for example, it can be calculated from a peak by using XRD.

$Li_2Ni_\alpha M^1_\beta M^2_\gamma Mn_v O_{4-\in}$ contains Ni in its composition. This Ni forms a local structure with 6-coordinated oxygen (O) (6-coordinated local structure). As a result, stable charge/discharge is performed. Further, a large amount of Ni as a redox species is contained in the range of $0.50 < \alpha \leq 1.33$, thus leading to achievement of high capacity. Moreover, large amounts of the $M^1$ element and the $M^2$ element are contained, thereby to further stabilize the crystal structure and reduce destruction of the bonding structure during charge/discharge, and as a result, a decrease in battery capacity is reduced. Further, the $M^1$ element and the $M^2$ element strongly fix oxygen. This results in reduction in desorption of oxygen which is concerned at the time of abnormal heat generation, thus leading to further improvement in safety of the battery. Moreover, when the amounts of the $M^1$ element and the $M^2$ element, or a total amount of the $M^1$ element and the $M^2$ element, is 0.33 or larger, on average, all of the oxygen in the Ni layer is adjacent to and strongly bonded to the $M^1$ element and the $M^2$ element, or either the $M^1$ element or the $M^2$ element, thus significantly enhancing the oxygen desorption reducing effect.

Specifically, a non-aqueous electrolyte secondary battery (lithium ion battery) is overcharged, a malfunction such as ignition and fuming may occur. Occurrence of ignition and fuming in this battery is greatly influenced by oxygen which is released from the positive electrode active material (positive electrode material) in the process to the occurrence. More specifically, electrons are taken from oxygen of the positive electrode active material during charge, thus making oxygen apt to be released. In the positive electrode material of the present disclosure, the $M^1$ element and the $M^2$ element in $Li_2Ni_\alpha M^1_\beta M^2_\gamma Mn_v O_{4-\in}$ are bonded to oxygen more strongly than Ni and other transition metal elements, thereby to exhibit high safety.

Further, out of the $M^1$ element and the $M^2$ element contained in $Li_2Ni_\alpha M^1_\beta M^2_\gamma Mn_v O_{4-\in}$, Sn and Sb are strongly bonded to oxygen. That is, it is possible to reduce oxygen desorption during charge/discharge to the minimum.

Moreover, $Li_2Ni_\alpha M^1_\beta M^2_\gamma Mn_v O_{4-\in}$, which forms the composite oxide, contains large amounts of the $M^1$ element and the $M^2$ element, thereby to further stabilize the crystal structure and reduce destruction of the bonding structure during charge/discharge. As a result, a decrease in battery capacity is reduced. The $M^1$ element and the $M^2$ element strongly fix oxygen. This results in reduction in desorption of oxygen which is concerned at the time of abnormal heat generation, thus leading to further improvement in safety of the battery. Moreover, when the amounts of the $M^1$ element and the $M^2$ element, or a total amount of the $M^1$ element and the $M^2$ element, is 0.33 or larger, on average, all of the oxygen in the Ni layer is adjacent to and strongly bonded to the $M^1$ element and the $M^2$ element, or either the $M^1$ element or the $M^2$ element, thus significantly enhancing the oxygen desorption reducing effect.

Furthermore, both the $M^1$ element and the $M^2$ element are preferably in a 6-coordinated state, and with this configuration, a structural gap with a local structure of the adjacent transition metal element (a coordination structure of Ni or Mn) can be made small and the durability can further be improved.

When $Li_2SnO_3$ is dissolved into $Li_2Ni_\alpha M^1_\beta M^2_\gamma Mn_\nu O_{4-\in}$ to form a solid solution (composite oxide), the layered structure including the Li layer and the Ni layer is formed in the solid solution (composite oxide). It is to be noted that, when a content of Mn in $Li_2Ni_\alpha M^1_\beta M^2_\gamma Mn_\nu O_{4-\in}$ is particularly small then, a Ni—O-based oxide and a Li—Sn—O-based oxide or a Li—Sb—O-based oxide are preferentially formed and the layered structure is not formed.

As described above, by use of the positive electrode material of the present disclosure, it is possible to obtain a non-aqueous electrolyte secondary battery which has excellent safety and in which deterioration in battery performance is reduced.

The composite oxide is preferably $xLi_2Ni_\alpha M^1_\beta M^2_\gamma Mn_\nu O_{4-\in}$-$(1-x)Li_2SnO_3$ ($0.5<x<0.95$). By forming the solid solution at this ratio, the composite oxide can exhibit the above effect more strongly. It is to be noted that, when x is 0.5 or lower, a content ratio of Ni (transition metal) that contributes to charge/discharge and exhibits a battery capacity decreases, to cause deterioration in battery performance. When x is 0.95 or larger, cation mixing in the oxide increases. Specifically, the Ni—O-based oxide and the Li—Sn—O-based oxide are preferentially formed, and the holding of the layered structure becomes difficult.

It is to be noted that a preferable range of x is not generally decided since the range varies depending on a specific composition (kinds of the $M^1$ element and the $M^2$ element, an atomic ratio of α, β, γ, ν and ∈, etc.) of $Li_2Ni_\alpha M^1_\beta M^2_\gamma Mn_\nu O_{4-\in}$, but for example, x is more preferably $0.8 \leq x \leq 0.9$.

The specific composition (kinds of the $M^1$ element and the $M^2$ element, an atomic ratio of α, β, and γ etc.) of $Li_2Ni_\alpha M^1_\beta M^2_\gamma Mn_\nu O_{4-\in}$ is not restrictive so long as the above composition is achieved.

It is more preferable that the $M^1$ element be at least one selected from Sn, $Sb_{0.5}Al_{0.5}$.

It is more preferable that the composite oxide be at least one of $xLi_2Ni_{1.33}Sb_{0.66}O_4$-$(1-x)Li_2SnO_3$ and $xLi_2NiSn_\beta Mn_\nu O_4$-$(1-x)Li_2SnO_3$ ($\nu+\beta=1.0$).

The positive electrode active material has to include the above positive electrode material as the positive electrode active material, and may further include another positive electrode active material (positive electrode material). The other positive electrode active material may either be another material included in the above chemical expression, or be still another component.

(Configuration Other than Positive Electrode Active Material)

The lithium-ion secondary battery 1 of the present embodiment can be configured similarly to the conventional lithium-ion secondary battery except for the use of the above positive electrode material as the positive electrode active material.

In the positive electrode 14, the positive electrode mixture layer 141 is formed by applying, to the positive electrode current collector 140, a positive electrode mixture obtained by mixing the positive electrode active material, a conductive material, and a binder.

The conductive material ensures electrical conductivity of the positive electrode 14. Examples of the conductive material to be used may include, but are not limited to, fine particles of graphite, acetylene black, Ketjen black, carbon black such as carbon nanofiber, fine particles of amorphous carbon such as needle coke.

The binder binds positive electrode active material particles or the conductive material. Examples of the binder to be used may include, but are not limited to, PVDF, EPDM, SBR, NBR, fluoro-rubber, and the like.

The positive electrode mixture is dispersed in a solvent and applied to the positive electrode current collector 140. As the solvent, normally, an organic solvent for dissolving the binder is used. Examples of the solvent may include, but are not limited to, NMP, dimethylformamide, dimethylacetamide, methyl ethyl ketone, cyclohexanone, methyl acetate, methyl acrylate, diethyltriamine, N,N-dimethylaminopropylamine, ethylene oxide, and tetrahydrofuran. Further, a dispersant, a thickener or the like may be added to water to form the positive electrode active material into a slurry by PTFE or the like.

Examples of the positive electrode current collector 140 to be used may include, but are not limited to, products obtained by processing a metal such as aluminum or stainless, specifically a foil processed into a sheet, net, punched metal, or a formed metal.

(Non-Aqueous Electrolyte)

The non-aqueous electrolyte 13 obtained by dissolving a supporting electrolyte into an organic solvent is used.

The kind of the supporting electrolyte of the non-aqueous electrolyte 13 is not particularly limited to, but is preferably one of mineral salts selected from $LiPF_6$, $LiBF_4$, $LiClO_4$, and $LiAsF_6$, derivatives of these mineral salts, organic salts selected from $LiSO_3CF_3$, $LiC(SO_3CF_3)_3$, $LiN(SO_2CF_3)_2$, $LiN(SO_2C_2F_5)_2$, $LiN(SO_2CF_3)(SO_2C_4F_9)$, and derivatives of these organic salts. These supporting electrolytes can make the battery performance more excellent, and can keep the battery performance higher also in a temperature range other than a room temperature. A concentration of the supporting electrolyte is not particularly limited, and it is preferable to appropriately select the concentration in consideration of the kinds of the supporting electrolyte and the organic solvent, according to the use.

The organic solvent (non-aqueous solvent) into which the supporting electrolyte is dissolved is not particularly limited so long as the organic solvent is used for a normal non-aqueous electrolyte. For example, carbonates, halogenated hydrocarbon, ethers, ketones, nitriles, lactones, oxolane compound, or the like can be used. In particular, propylene carbonate, ethylene carbonate, 1,2-dimethoxyethane, dimethyl carbonate, diethyl carbonate, ethyl methyl carbonate, vinylene carbonate, and the like, and mixed solvents of these are suitably used. By particularly using one or more non-aqueous electrolytes selected from the group consisting of carbonates and ethers out of the above cited organic solvents, the solubility, dielectric constant, and viscosity of the supporting electrolyte are made excellent and the charge/discharge efficiency of the battery is made high, which is preferred.

In the lithium-ion secondary battery 1 of the present embodiment, the most preferable non-aqueous electrolyte 13 is obtained by dissolving the supporting electrolyte into the organic solvent.

(Negative Electrode)

As for the negative electrode 17, the negative electrode mixture layer 171 is formed by applying a negative electrode mixture, obtained by mixing a negative electrode active material and a binder, on the surface of the negative electrode current collector 170.

As the negative electrode active material, a conventional negative electrode active material can be used. A negative electrode active material containing at least one element of Sn, Si, Sb, Ge, and C can be cited. Out of these negative electrode active materials, C is preferably a carbon material capable of storing and desorbing electrolytic ions of the lithium-ion secondary battery 1 (a carbon material having a Li storage capacity), and C is more preferably amorphous-coated natural or artificial graphite.

Further, out of these negative electrode active materials, particularly, Sn, Sb, and Ge are alloy materials with great changes in volume. These negative electrode active materials may form alloys with other metals, such as Ti—Si, Ag—Sn, Sn—Sb, Ag—Ge, Cu—Sn, and Ni—Sn.

As the conductive material, a carbon material, a metal powder, a conductive polymer, or the like can be used. From the viewpoint of the conductivity and the stability, it is preferable to use a carbon material such as acetylene black, Ketjen black, or carbon black. For example, the negative electrode can be include either one of these or combination of these.

Examples of the binder may include polytetrafluoroethylene (PTFE), polyvinylidene fluoride (PVDF), a fluororesin copolymer (tetrafluoroethylene-hexafluoropropylene copolymer) SBR, acrylic rubber, fluoro-rubber, polyvinyl alcohol (PVA), styrene-maleic acid resin, sodium polyacrylate, and carboxylmethyl cellulose (CMC).

Examples of the solvent may include an organic solvent such as N-methyl-2-pyrrolidone (NMP), and water.

As the negative electrode current collector 170, it is possible to use a conventional current collector, and is possible to use a product obtained by processing a metal such as copper, stainless, titanium, and nickel, specifically foil processed into a sheet, a net, a punched metal or a formed metal, but these are not restrictive.

(Other Configurations)

The positive electrode case 11 and the negative electrode case 16 seal built-in contents by using the sealing member 12. The built-in contents include the non-aqueous electrolyte 13, the positive electrode 14, the separator 15, the negative electrode 17, the holding member 18, and the like.

The positive electrode mixture layer 141 comes into surface contact with the positive electrode case 11 via the positive electrode current collector 140, to make electrical conduction. The negative electrode mixture layer 171 comes into surface contact with the negative electrode case 16 via the negative electrode current collector 170.

The separator 15 interposed between the positive electrode mixture layer 141 and the negative electrode mixture layer 171 electrically insulates the positive electrode mixture layer 141 and the negative electrode mixture layer 171, and holds the non-aqueous electrolyte 13. As the separator 15, for example, a porous synthetic resin film, especially a porous film of a polyolefin polymer (polyethylene, polypropylene) is used. The separator 15 is molded into a larger size than sizes of the two mixture layers 141, 171 so as to ensure electrical insulation between the two mixture layers 141, 171.

The holding member 18 serves to hold the positive electrode current collector 140, the positive electrode mixture layer 141, the separator 15, the negative electrode mixture layer 171, and the negative electrode current collector 170 at regular positions. The use of an elastic member such as an elastic piece or a spring facilitates holding of those at the regular positions.

Other Embodiments

The lithium-ion secondary battery 1 of the present embodiment has the coin shape as described above, but the shape is not particularly limited. The lithium-ion secondary battery can be a battery in a variety of shapes such as a cylindrical shape and a prismatic shape, or an irregularly shaped battery sealed in a laminated exterior body.

(Manufacturing Method)

A manufacturing method for the positive electrode material of the present embodiment is not restricted so long as the positive electrode material has the above composition and configuration. Examples of the manufacturing method may include a method of heating a precursor of one of $Li_2Ni_\alpha M^1_\beta M^2_\gamma Mn_\nu O_{4-\epsilon}$ and $Li_2SnO_3$, or precursors of both of them. Also, the examples of the manufacturing method may include a method of using these methods singly or in combination.

EXAMPLES

Hereinafter, the present disclosure will be described with reference to examples.

As examples for specifically describing the present disclosure, a positive electrode material (positive electrode active material), and a positive electrode and a lithium-ion secondary battery using the positive electrode material were manufactured. In the examples, the lithium-ion secondary battery shown in FIG. 1 was manufactured.

Example 1

A positive electrode material of the present example is an oxide having a composition of $0.5Li_2NiSnO_4$-$0.5Li_2SnO_3$ as a composition to be confirmed by ICP.

Figure 2:
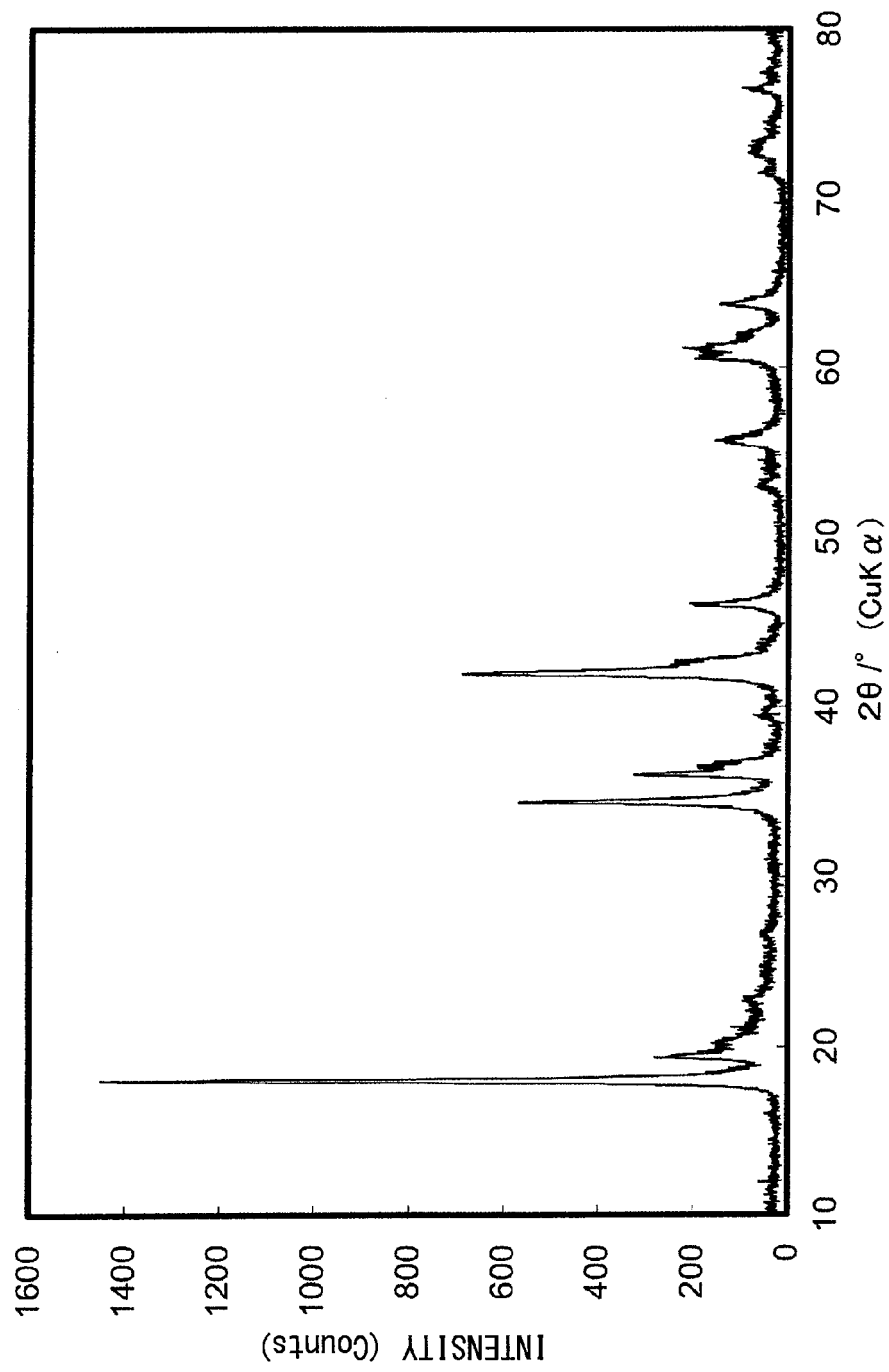
FIG. 2 is a graph showing a measurement result of powder XRD on a positive electrode material of Example 1.

The positive electrode material of the present example was confirmed by XRD to take a structure having an almost single-phase crystal structure, and it was thus confirmed that the positive electrode material had a solid solution. Further, it was confirmed that the XRD pattern showed a pattern characteristic of a layered rock salt type. A measurement result of XRD is shown in FIG. 2.

As described above, it was confirmed that the positive electrode material of the present example was a solid solution with a layered structure having a composition of $0.5Li_2NiSnO_4$-$0.5Li_2SnO_3$.

Example 2

A positive electrode material of the present example is an oxide having a composition of $0.67Li_2NiSnO_4$-$0.33Li_2SnO_3$ as a composition to be confirmed by ICP.

Figure 3:
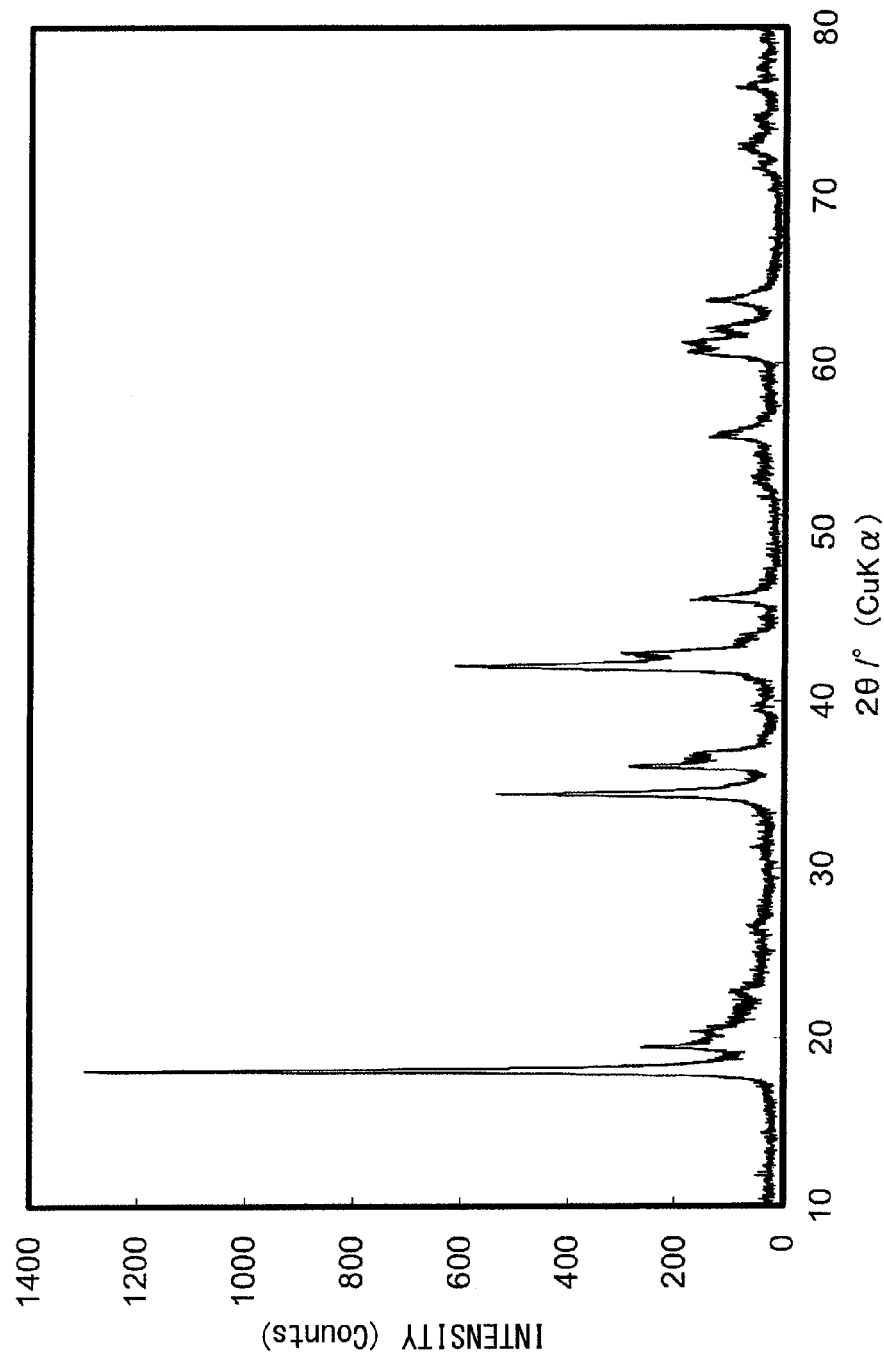
FIG. 3 is a graph showing a measurement result of powder XRD on a positive electrode material of Example 2.

The positive electrode material of the present example was confirmed by XRD to take a structure having an almost single-phase crystal structure, and it was thus confirmed that the positive electrode material had a solid solution. Further, it was confirmed that the XRD pattern showed a pattern characteristic of a layered rock salt type. A measurement result of XRD is shown in FIG. 3.

As described above, it was confirmed that the positive electrode material of the present example was a solid solution with a layered structure having a composition of $0.67Li_2NiSnO_4\text{-}0.33Li_2SnO_3$.

Example 3

A positive electrode material of the present example is an oxide having a composition of $0.9Li_2NiSnO_4\text{-}0.1Li_2SnO_3$ as a composition to be confirmed by ICP.

Figure 4:
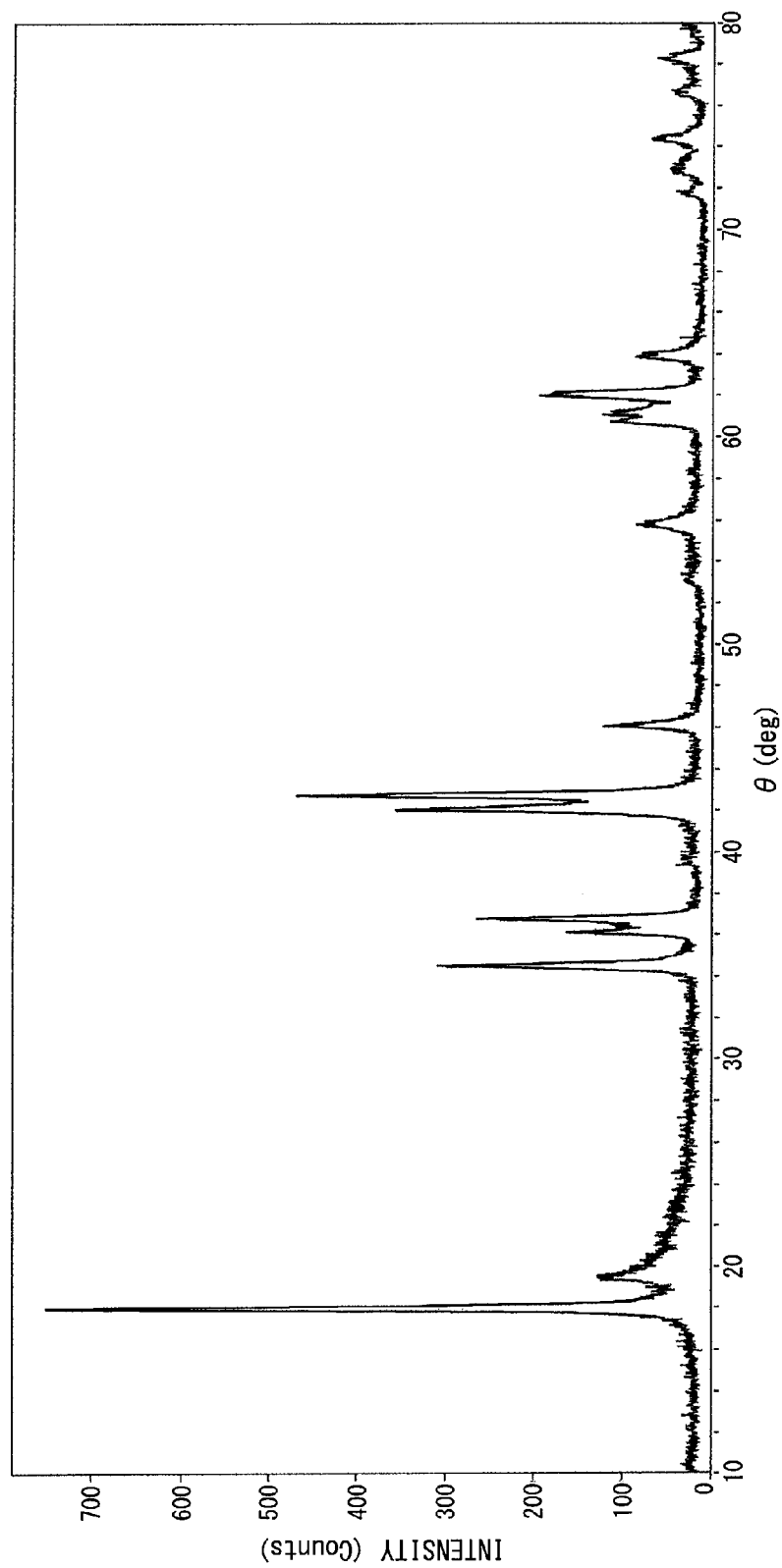
FIG. 4 is a graph showing a measurement result of powder XRD on a positive electrode material of Example 3.

The positive electrode material of the present example was confirmed by XRD to take a structure having an almost single-phase crystal structure, and it was thus confirmed that the positive electrode material had a solid solution. Further, it was confirmed that the XRD pattern showed a pattern characteristic of a layered rock salt type. A measurement result of XRD is shown in FIG. 4.

As described above, it was confirmed that the positive electrode material of the present example was a solid solution with a layered structure having a composition of $0.9Li_2NiSnO_4\text{-}0.1Li_2SnO_3$.

Example 4

A positive electrode material of the present example is an oxide having a composition of $0.9Li_2Ni_{1.33}Sb_{0.66}O_4\text{-}0.1Li_2SnO_3$ as a composition to be confirmed by ICP.

Figure 5:
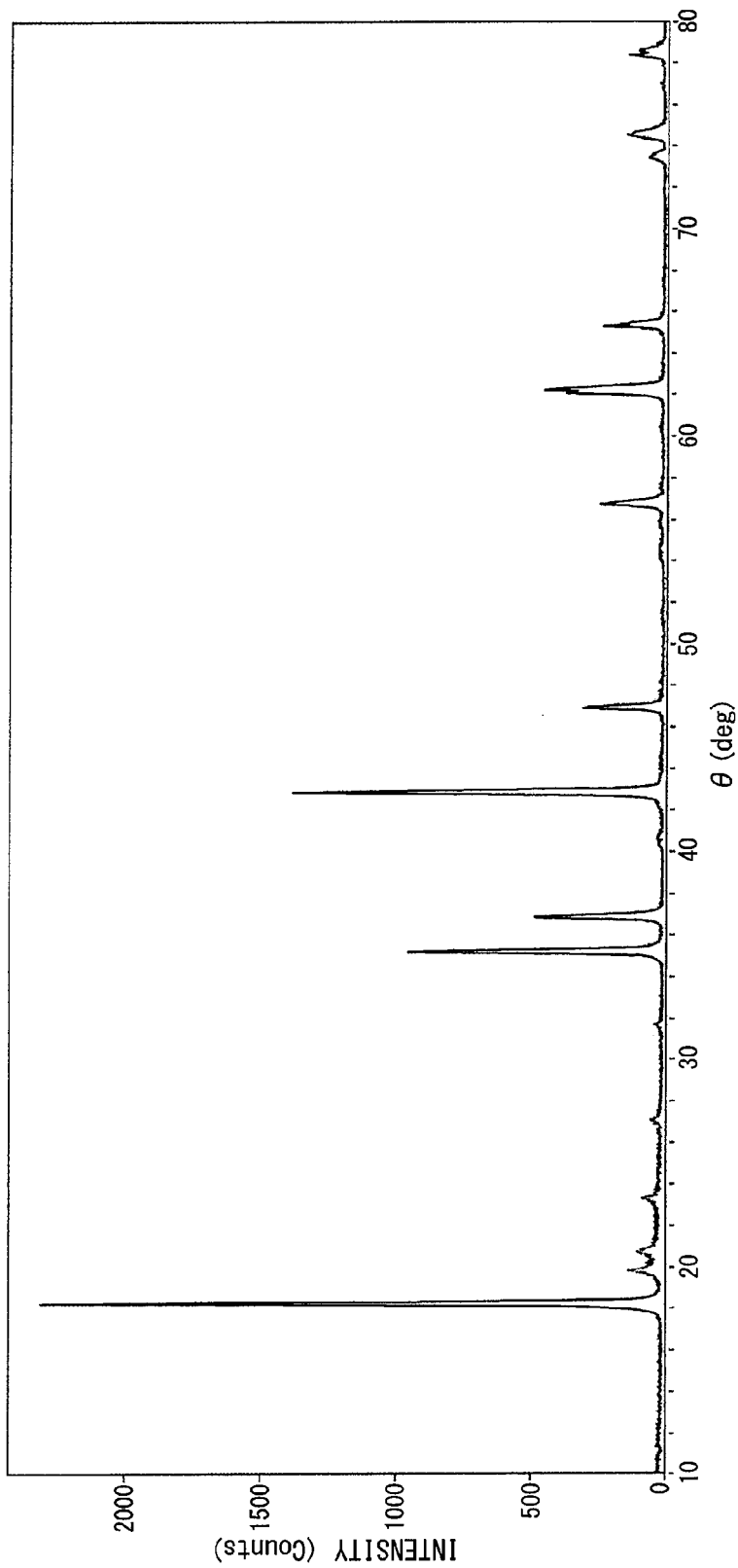
FIG. 5 is a graph showing a measurement result of powder XRD on a positive electrode material of Example 4.

The positive electrode material of the present example was confirmed by XRD to take a structure having an almost single-phase crystal structure, and it was thus confirmed that the positive electrode material had a solid solution. Further, it was confirmed that the XRD pattern showed a pattern characteristic of a layered rock salt type. A measurement result of XRD is shown in FIG. 5.

As described above, it was confirmed by ICP that the positive electrode material of the present example was a solid solution with a layered structure having a composition of $0.9Li_2Ni_{1.33}Sb_{0.66}O_4\text{-}0.1Li_2SnO_3$.

Comparative Example 1

Aqueous solutions containing respective metal complexes of Li, Ni and Sn were prepared. The obtained complex solutions were mixed such that a composition ratio thereof became a composition ratio of a target positive electrode material, namely, an atomic ratio of Li:Ni:Sn became 2.1:1:1.

The obtained mixed solution was dried in a drying oven to remove an organic component by heating treatment, which was then heated and baked.

As described above, the mixture (mixed powder), prepared by obtaining the oxide powder with the composition ratio of $Li_2NiSnO_4$ and thereafter mixing $Li_2NiSnO_4$ and $Li_2SnO_3$ at the atomic ratio of 50:50, is the positive electrode material of the present example.

<Evaluation>

As evaluation of each of the positive electrode materials, a lithium-ion secondary battery was assembled, to evaluate charge/discharge characteristics. Further, after measurement of the charge/discharge characteristics, the coin type battery was disassembled and the positive electrode was taken out, to evaluate the safety.

It is to be noted that the positive electrode material was evaluated in Examples 1 to 4 and Comparative Example.

(Lithium-Ion Secondary Battery)

Using the positive electrode active material of each example above, a test cell (2032 coin type half cell) made of the lithium-ion secondary battery was assembled, to perform evaluation.

(Coin Type Half Cell)

A test cell (coin type half cell) has a similar configuration to that of the coin type lithium-ion secondary battery 1, the configuration of which was shown in FIG. 1.

As the positive electrode, there was used a positive electrode with the positive electrode mixture layer 141 formed by applying a positive electrode mixture, obtained by mixing 91 parts by mass of the positive electrode active material (positive electrode active material of each example), 2 parts by mass of acetylene black, and 7 parts by mass of PVDF, to the positive electrode current collector 140 made of aluminum foil.

As the negative electrode (counter electrode), metallic lithium was used. This corresponds to the negative electrode mixture layer 171 in FIG. 1.

The non-aqueous electrolyte 13 was prepared by dissolving $LiPF_6$ into a mixed solvent of 30 vol % of ethylene carbonate (EC) and 70 vol % of diethyl carbonate (DEC) such that 1 mol/l of $LiPF_6$ was contained.

After being assembled, the test cell was subjected to activation treatment by ⅓ C×2 cycles of charge/discharge.

In the above manner, the test cell (half cell) of each example was manufactured.

<Charge/Discharge Characteristics>

Five cycles of charge/discharge were performed on the lithium-ion secondary battery at the rate of ⅕₀ C. The charge was performed by CC charge with 4.5-V cut off, and the discharge was performed by CC discharge with 2.6-V cut off.

An initial capacity and a capacity maintenance rate after five cycles were measured. The results are shown in Table 1.

TABLE 1

| | Battery evaluation | | |
|---|---|---|---|
| | Initial capacity (mAh/g) | Capacity maintenance rate (%) | Safety test oxygen generation rate (%) |
| Example 1 | 124 | 99.5 | 0.34 |
| Example 2 | 132 | 98.3 | 0.29 |
| Example 3 | 151 | 98.6 | 0.29 |
| Example 4 | 140 | 99.1 | 0.41 |
| Comparative Example 1 | 0 | Unable to be tested | Unable to be tested |

As shown in Table 1, in each of the lithium-ion secondary batteries in Examples 1 to 4, it was confirmed that a high discharging capacity exhibition rate was obtained and that the battery was a secondary battery excellent in durability characteristics.

On the other hand, in the lithium-ion secondary battery of Comparative Example, the battery capacity was not confirmed. That is, the battery was not functioned as a battery at all.

As described above, it was confirmed from the measurement results of Examples 1 to 4 that the batteries had a layered crystal structure which was advantageous for charge/discharge, and had the material which was a solid solution having a stable crystal structure. It was further confirmed that the batteries each were a lithium-ion secondary battery capable of realizing stable charge/discharge.

<Safety Test>

The lithium-ion secondary battery was charged by CC charge at the rate of 1/50 C up to 4.8 V.

After the charge, the battery was disassembled and the positive electrode was taken out.

The taken-out positive electrode was washed by DMC, and then heated in a helium atmosphere from a room temperature to 1000° C. with a programming rate of 20° C./min. An amount of oxygen generated from the positive electrode at that time was measured by TPD-MS measurement.

Table 1 also shows measurement results.

As shown in Table 1, the amounts of oxygen generated in the secondary batteries of the respective examples are as small as 0.41% at the maximum, and any of the amounts is excellently small.

According to each of the above tests, the secondary battery of each of the examples is a secondary battery excellent in battery characteristics and safety.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A positive electrode material comprising:
a composite oxide of solid solution including at least one of $xLi_2Ni_{1.33}Sb_{0.66}O_4$-$(1-x)Li_2SnO_3$ and $xLi_2NiSn_\beta Mn_\nu O_4$-$(1-x)Li_2SnO_3$ wherein:
$\beta$ satisfies an equation of $0<\beta<1.0$;
$\nu$ satisfies an equation of $0\leq\nu\leq0.66$;
x satisfies an equation of $0.5<x<0.95$; and
$\nu$ and $\beta$ satisfies an equation of $\nu+\beta=1.0$.

2. A positive electrode for a non-aqueous electrolyte secondary battery comprising:
the positive electrode material according to claim 1.

3. A non-aqueous electrolyte secondary battery comprising:
a positive electrode for a non-aqueous electrolyte secondary battery which includes the positive electrode material according to claim 1.

* * * * *